United States Patent [19]

Werner et al.

[11] Patent Number: 4,735,503

[45] Date of Patent: Apr. 5, 1988

[54] METHOD FOR DETERMINING THE DIRECTION AND SPEED OF WIND IN THE ATMOSPHERE

[75] Inventors: Christian Werner; Friedrich Köpp, both of Munich, Fed. Rep. of Germany; Ronald Schwiesow, Boulder, Colo.; Felix Bachstein, Munich, Fed. Rep. of Germany

[73] Assignee: Deutsche Forschungs- und Versuchsanstalt fur Luft-und Raumfahrt, Munich, Fed. Rep. of Germany

[21] Appl. No.: 871,075

[22] Filed: Jun. 5, 1986

[30] Foreign Application Priority Data

Jun. 5, 1985 [DE]  Fed. Rep. of Germany ....... 3520214

[51] Int. Cl.⁴ .............................................. G01P 3/36
[52] U.S. Cl. .................................... 356/28.5; 356/342
[58] Field of Search ............................... 356/28.5, 342

[56] References Cited

U.S. PATENT DOCUMENTS

| | | | |
|---|---|---|---|
| 3,528,741 | 9/1970 | Benson et al. | 356/28.5 |
| 3,984,685 | 10/1976 | Fletcher et al. | 356/28.5 |
| 4,289,397 | 9/1981 | Itzkan et al. | 356/5 |
| 4,610,540 | 9/1986 | Mossey | 356/28.5 |

Primary Examiner—Stephen C. Buczinski
Attorney, Agent, or Firm—Collard, Roe & Galgano

[57] ABSTRACT

A method and device is provided for determining the direction and speed of wind in the atmosphere by means of a laser-Doppler anemometer, wherein only values measured in a sector of about 100° and less of an azimuth scan are supplied or fed to a multiple-peak finder of a measuring device. In order to attain a high processing speed, flowing differentiation takes place by means of digitally operating systems. In order to eliminate the influences from clouds, haze, fog and the like in the measuring device, several frequency maximums are always traced in the multiple-peak finder, whereby in each case a preceding maximum is related to a trailing maximum until the trailing maximum is smaller than the preceding maximum. Because of the attainable high-speed sector scanning, the measuring device can be used for the determination of multiple wind peaks caused by clouds and/or fog echoes, or at an installation site where the measuring range is highly restricted, or also for detecting aircraft wake vortices.

1 Claim, 13 Drawing Sheets

METHOD FOR DETERMINING THE DIRECTION AND SPEED OF WIND IN THE ATMOSPHERE

The present invention relates to a method and device for measuring and determining the direction and speed of wind in the atmosphere and, more particularly, it relates to such a method and device which utilizes a laser-Doppler anemometer with a scanning mechanism.

The applicant herein had earlier developed a continuous wave type laser-Doppler anemometer (hereinafter briefly referred to as the "LD-anemometer") for measuring the boundary wind layers, by means of which anemometer the horizontal wind, i.e., its two components, as well as the wind profile under different weather conditions are measured, in each case by a full scanning across an azimuth angle of 360 degrees under different angles of elevation. This development was reported by the applicant herein in Research Report "DFVLR-FB 83-11" of the German Aerospace Research Establishment. The results obtained with this LD-anemometer were compared to conventional profiles obtained with weather balloon probes, for example at altitudes of at least 250 meters to 750 meters and higher. In connection with these measurements it was found that wind profiles determined with the LD-anemometer in the first 750 meters are more typical of the average wind profile than the profiles derived from probe measurements, because the LD-anemometer in itself creates a spatial mean value.

Figure 1:
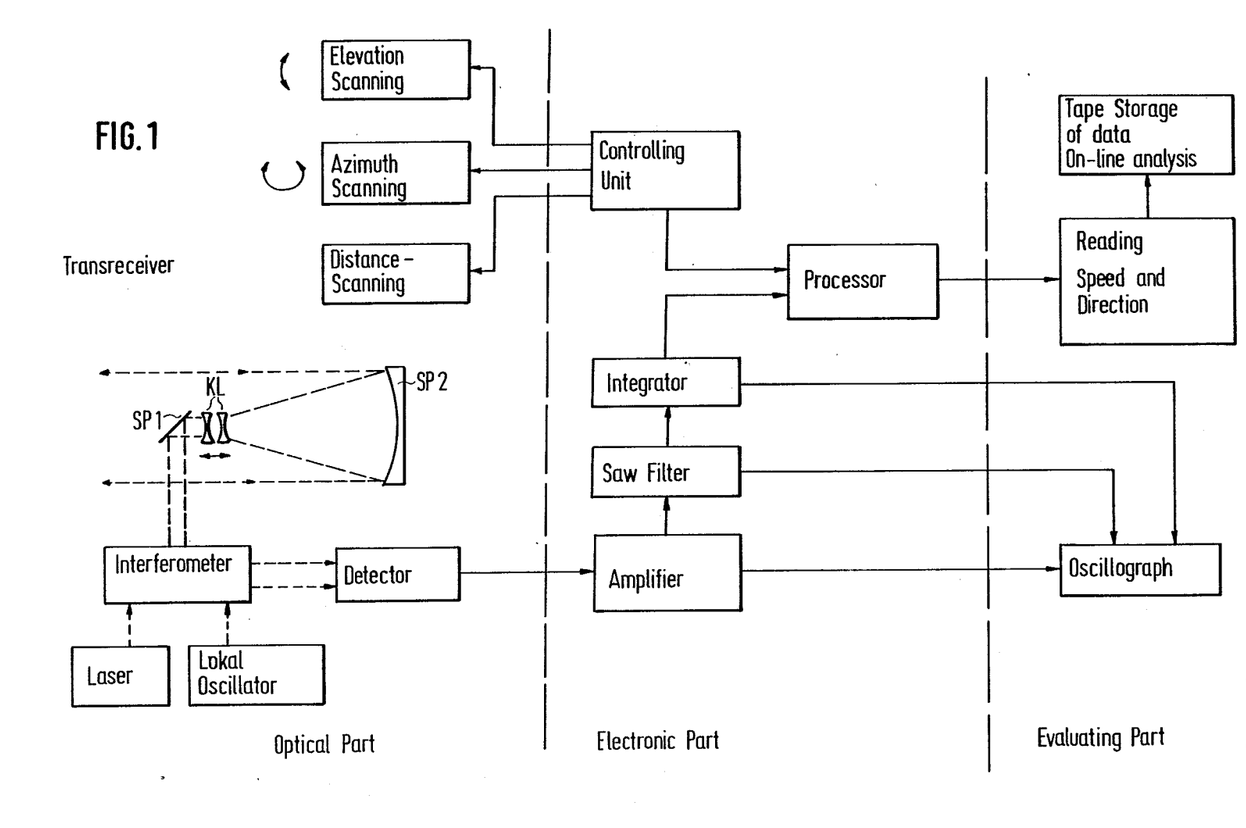
FIG. 1 is a block diagram of the optical and electronic parts as well as the evaluating part of a continuous wave Doppler-anemometer.

In FIG. 1 there is shown a block diagram of such a conventional LD-anemometer of the type published in the DFVLR-bulletins 79-18 of the German Aerospace Research Establishment. In the conventional anemometer, a transreceiver with an aperture diameter of 30 centimeters and a scanning system with two mirrors SP1 and SP2 is used. For distance scanning, two collimator lenses KL are provided. With a distance sharply focused at 100 meters, the distance resolution capability amounts to 6 meters. The radiation of a local oscillator and the doppler-shifted signal from the measurement volume, after passing through an interferometer, are mixed in a detector. For processing doppler-shifted signals, an acoustic surface wave spectrum analyzer SAW is used.

One single radial speed spectrum can be obtained within 50 μs, and an integrator permits a mean value to be established over 50 ms. The signal is supplied to an oscillograph and entered in a processor for data readout and data storage.

A field of wind, due to atmospheric inhomogeneities especially near the surface of the earth, is generally not the same at all points of a full scan for a velocity azimuth display (hereinafter briefly referred to also as "VAD-scanning"). It is, therefore, common procedure to compare speed profiles obtained from different sectors in the scanning in order to establish conformity between these profiles. Measurements of the velocity and direction of wind carried out with the LD-anemometer up to an altitude of 750 meters, which measurements were produced from radial speed data on only part of a full azimuth circle, were preferably compared to measurements obtained from a full-circle scan.

In connection with the present invention, this time-consuming comparison between values obtained from sectors and values obtained by a full scan is omitted. Therefore, the invention provides a measuring method for determining the direction and speed of wind in the atmosphere, by means of which a wind profile can be produced with about the same degree of accuracy as with a full-circle scan, but in a significantly shorter time, even in the presence of some obstruction or limitation or restriction due to local or spatial conditions at the installation site of the measuring system.

This object is accomplished, in accordance with the present invention, by a method and device for determining the direction and speed of wind in the atmosphere utilizing a laser-Doppler anemometer with a scanning mechanism wherein only measured values from a sector of about 100° and less of an azimuth scanning are supplied to a multiple peakfinder, in which a flowing differentiation takes place for achieving a high processing speed by means of digitally operating systems.

With the measuring method and device according to the present invention, the measuring time for a scan across a quarter-circle sector is in the order of magnitude of, by way of example, 12 seconds. However, due to the utilization of a multiple peakfinder, usable speed estimates are feasible even with sector scans of up to 1/16th part of a circle, whereby it is preferred that a balanced adjustment program is additionally used for the least error squares in order to analyze the radial speed opposite azimuth data. Data collected in actual use are obviously influenced by clouds and fog acting on the wind measurements carried out with the measuring system of the invention. Such influence may be greatly reduced with the help of visibility and cloud ceiling information in combination with an analysis of the actual speed spectrum that is finer than the analysis permitted by a single-peak finder. The data system connected to the output side of the measuring device of the invention has been adapted to meet the requirements for sector scanning as well as with respect to the multiple-peakfinder used under any weather conditions.

A modified measuring system may also be used for investigating boundary layers, for air pollution control or monitoring, as well as for ballistic investigations or tests especially if parts of the atmosphere are obscured by trees or hills. Information about wind profile is useful or desirable in other fields as well, an example of a specific application or use of the measuring device of the invention is to detect the so-called wake vortices of large aircraft during landing.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 2b shows a projection on the surface of the earth of the scans shown in FIG. 2a;

Heterodyne Doppler-LD-anemometers measure the radial component of wind, i.e., the wind speed component along the sight or position line of the LD-anemometer. For determining the intensity and direction of a horizontal wind, distance, azimuth and elevation angle scannings are required. In addition, the mean velocity and direction of the horizontal wind may be determined based on radial wind speed data along horizontal circles, the circles being centered with respect to the vertical axis of a scanning device or scanner. By changing the height of the circles, it is possible to measure vertical profiles of a horizontal wind. This measuring method is referred to as conical scanning because the measuring beam passes through a cone having its peak disposed at the bottom of the scanner. Since the data as a function of the scanning azimuth consist of radial speed values, the method is referred to also as velocity azimuth indication or display scan (hereinafter briefly referred to as the so-called "VAD-scan").

Figure 2A:
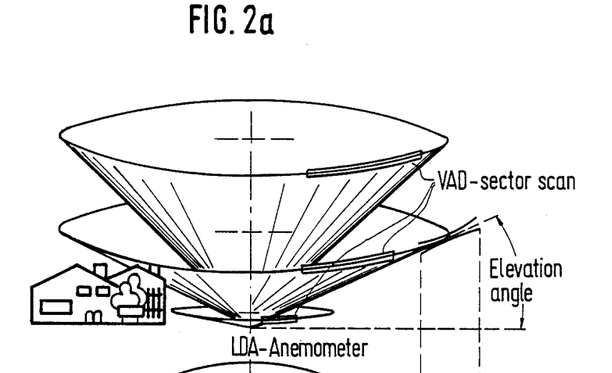
FIG. 2a shows perspective views of scans with velocity-azimuth indication (VAD-indication) at different elevation angles.
Figure 2B:
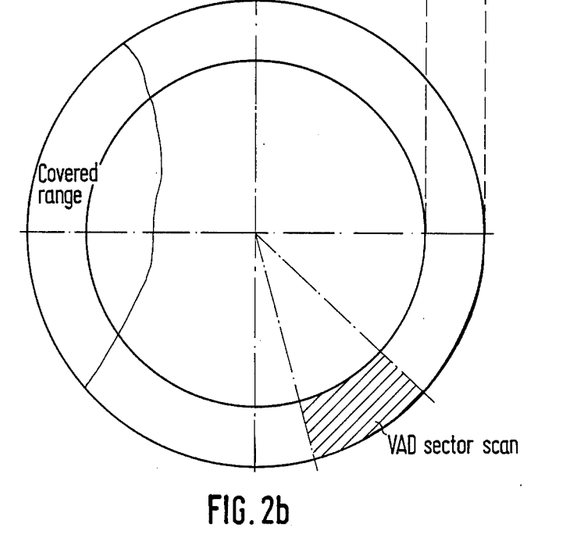

FIG. 2a shows different VAD-scan cones with different angles of elevation and different ranges, or distances, whereby a so-called VAD-sector scan is plotted on each individual scanning cone in the form of a double line. FIG. 2a, furthermore, shows a schematic view of buildings representing an obstruction with small angles of elevation; no scanning is possible in the direction of such an obstruction. In FIG. 2b, a thin wavy line indicates the range or zone covered by the buildings at low angles of elevation. Furthermore, in FIG. 2b, which shows a top view of FIG. 2a, there is shown a projection of a VAD-scan on a horizontal plane with respect to the area of expansion of the focal volume, i.e., the sensitive area, which projection is shown by the shaded sector.

As mentioned earlier and shown in FIG. 2a, a scan with an LD-anemometer is obstructed in defined ranges of the azimuth, for example by buildings, trees and also hills and the like, which means that usable data are supplied by only part of a scan, which, in this case, is not centered above the LD-anemometer.

Figure 3:
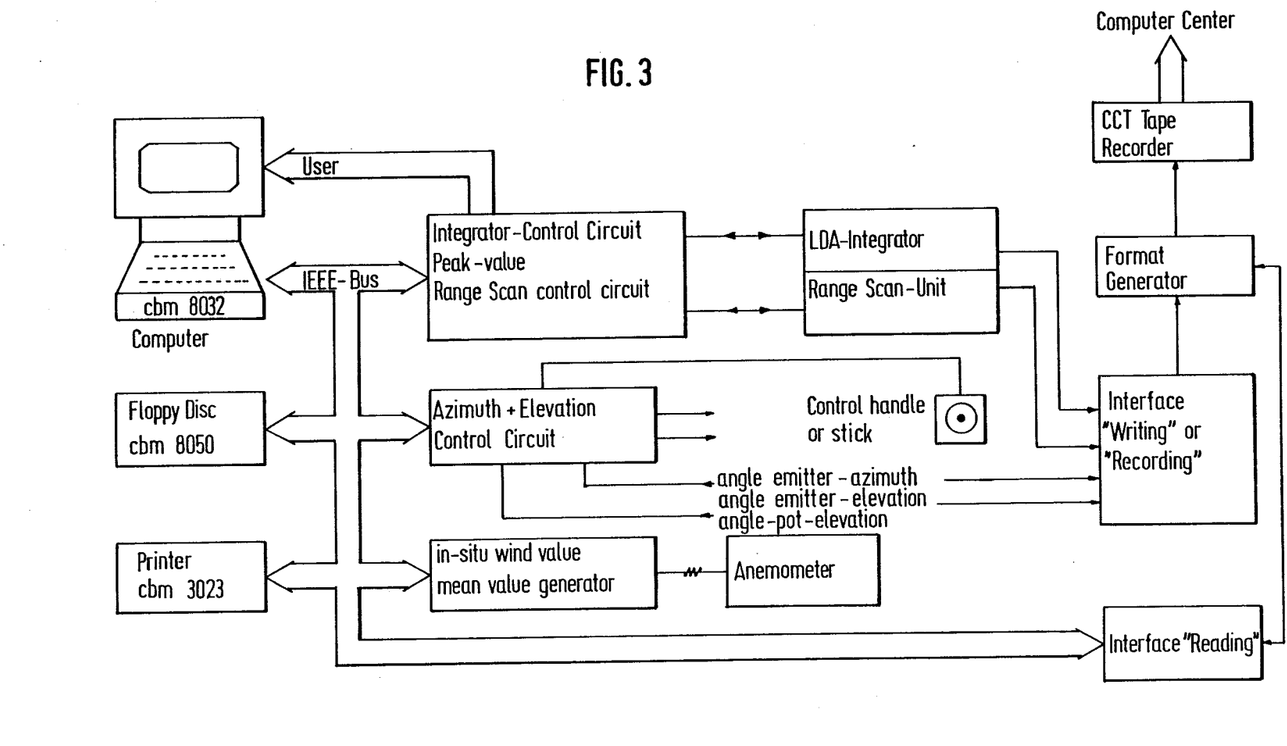
FIG. 3 is a block diagram of a high-speed data system.

However, even wind values derived from scans across part of a full circle are entirely representative of the wind conditions in said scanned part, a fact supported by extensive theoretical investigations and practical tests conducted by the inventors. However, a very specific control procedure is required in order to realize a usable scan pattern. FIG. 3 shows a block diagram for the implementation of such a method.

In the field of laser technology, the received signals of a reflected laser light are received as so-called signal transients, which transients approximately conform to a $1/x^2$ function and which may contain a varying number of target echoes. Therefore, the target echoes are added to or "impressed" on the $1/x^2$ function as signal peaks. In most cases of practical application, it is of interest to determine as rapidly as possible the amplitude and delay in the transit time of the signal peaks in relation to the emitted laser light pulse.

The degree of reflection and the distance or range of the target on which a bearing is taken must be determined with the help of the peak value amplitude and transit time of the light. For rapidly evaluating the peak signal values, the received transient of the reflected signal is checked for maximums. For this purpose, the reversing points of all peak values are determined.

This determination must be carried out independently of the basic course of the curve of the echo, i.e., any differentiation of the peaks may relate exclusively only to said peaks, and it must disregard the course of the basic function of the transient, whereby such "flowing differentiation" must be carried out by means of digital systems in view of the necessarily high processing speeds.

For this reason, the reflected or echoed signal must be digitalized by means of an analog-to-digital converter (ADC) and stored in a memory. This function, which, in a sense, is frozen, can be read out and supplied or fed to the peakfinder in dots. In the peakfinder fed with this information, a preceding measured value is compared to a following or trailing measured value, and it is determined by this comparison whether the trailing value is higher than the preceding one. This operation or process is carried out repeatedly until the trailing measured value becomes lower than the preceding one. At this point, then, the system evaluator electronics stop the search run and determine the amplitude and transit time for registration on a mass storage unit such as, for example, a magnetic tape.

This evaluation method has the advantage that parts of the echo-signal pattern that are not of interest are scanned at an extremely high speed, and an evaluation as well as data gathering and data output take place only if a signal peak has been found whose amplitude sweep or size is of no importance in the evaluation because the reversing point of said peak is the decisive criterion. This process is applied to random signal patterns containing information which, on account of their reversing points, are significant for such intended evaluation.

According to the present invention, this process is used in combination with a multiple peakfinder and the LD-anemometer described above. As described atove, the anemometer operates with a continuous wave or CW-laser, and the speed of the wind is measured with this anemometer, with exploitation of the Doppler-effect. In the process, the signal peaks appearing in an echo-signal indicate or show the wind speeds determined at a defined (focused) measuring point.

In the present case, the evaluation primarily relates to the "Doppler frequency shift", which is proportional to the speed of the wind, and which, in the electronic graphical representation of the reflected signal, behaves similarly to conventional LIDAR-reflection signals with respect to the signal peaks. The position of the measured peak values on the time axis of a digital recording (see FIG. 4) conforms to an exactly defined wind speed.

The LD-anemometer has a mean value generator, by means of which it is possible to add up a total of up to 1024 frequency spectra in order to enhance in this way the signal-to-noise ratio.

Figure 13:
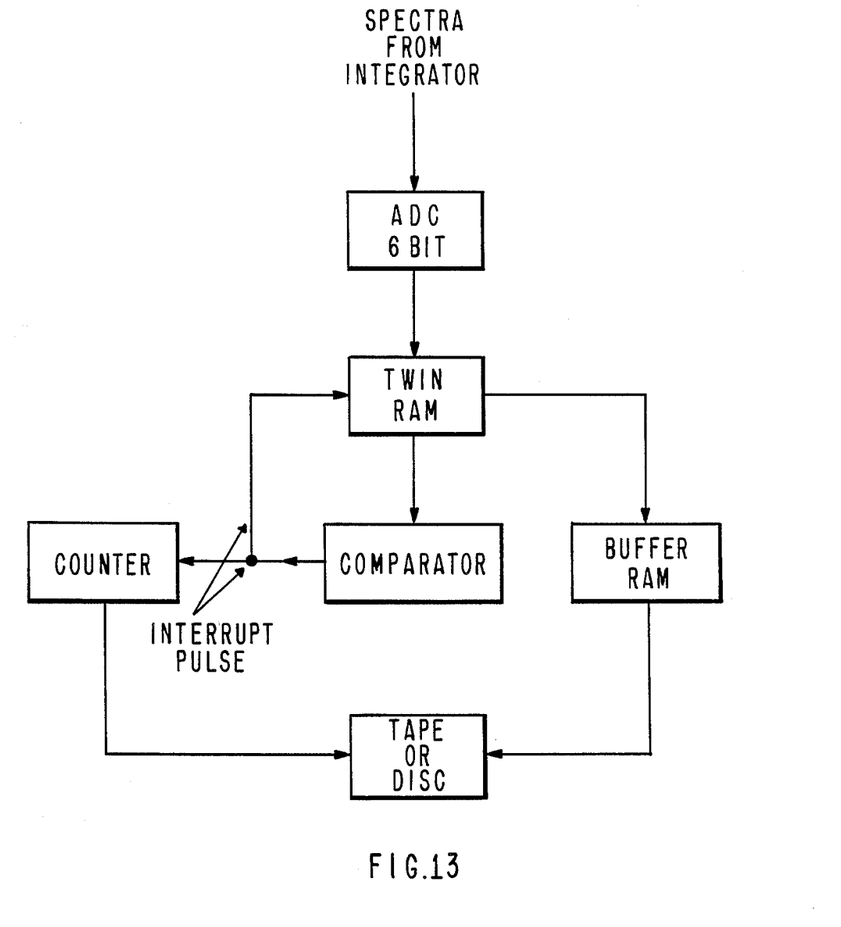
FIG. 13 is a block diagram of the peakfinder as utilized in the evaluating system of the present invention.

On completion of such an averaging process, as clearly seen in FIG. 13, the evaluation electronics pick up one spectrum and digitalizes it in an analog-to-digital converter (ADC).

The digitalized signal has a resolution of 6 bits for the full selection range, which is limited to a signal amplitude of 1V. In an after-connected circuit consisting of two random memories forming a so-called twin-RAM, two consecutive signals are picked up from the memory of the last mentioned analog-digital converter (ADC), temporarily stored in said twin-RAM memory and tested for the criterion whether the trailing, i.e., the $(n+1)$-value A, was greater than the preceding one, i.e., the (n)-value B. A digital comparator (COMP) connected to the output side of the twin-RAM-memories has three decision outputs, to which the given ratio of the two values to be compared is applied in a way such that the three following propositions may be picked up: value A greater than value B; value A equal to value B; and value A less than value B.

In this process, the digital comparator (COMP) changes its value from a digital "$\emptyset$" to a digital "1" if value A is greater than value B ($A>B$), and said comparator (COMP) returns to its "$\emptyset$"-state only if value A is neither greater than nor equal to value B. In this way, the digital transition from a digital "$\emptyset$" to a digital "1" may be determined by means of an electronic differentiator (DIFF), which differentiator shows no reaction if the signal output changes from a digital "$\emptyset$" to a digital "1".

Based on this differentiation, a pulse is obtained by means of which an interruption of the evaluation cycle is initiated and the significant peak values such as the amplitude and time position may be transferred to another temporary or buffer memory (BUFF-RAM). In said step, a cooperating counter registers the number of peak values. After a given spectrum has been completely tested for signal peaks, if any, a so-called compact data transfer to a mass data memory takes place, which memory may be, for example, a magnetic tape. In this step, all data retrieved from the temporary or buffer memory (BUFF-RAM) are read out in a defined format and stored on the mass data memory, for example in the form of a magnetic tape, including other important system data (the so-called housekeeping).

Now, in the evaluation process in an after-connected computer center, which process may follow immediately or at a later time, all parameters of the measuring system as well as the number of signal peaks to be evaluated, their amplitudes and their spectral positions are obtained. The evaluation time in the after-connected computer center is significantly reduced with the help of the process, which completes very rapid preclassification processes even while data are being recorded.

The total measuring system is controlled by a computer, for example by a CBM 8096 computer; in this connection, interfaces for the data and control units of the computer, for example a floppy disc CBM 8050 and a printer CBM 3023, have to be compatible with an IEEE-bus. The scanner is controlled in the course of the various scanning steps by means of azimuth and elevation loops, for example with the help of the VAD-technique or elevation-scan technique, so that all control signals are entered in the system via the keyboard of the computer.

In the case of VAD-measurements with full-circle scannings, the angle of elevation and the number of azimuth turns are transmitted. However, in high-speed sector scanning, only part of a turn is exploited, and the corresponding azimuth angles are transmitted. In the case of an elevation angle scanning, for example when tracing the wake vortices of an aircraft, an (imaginary) vertical scan plane must be established perpendicular to the direction of the landing runway. On this plane, then, a sufficient height between the surface of the earth or ground and the expected wake vortices is covered by high-speed elevation angle scanning. The top and bottom angles of elevation as well as the scanning speed may be selected accordingly by input via the keyboard of the computer used. Thereafter, the elevation angle scan runs automatically.

Figure 4:
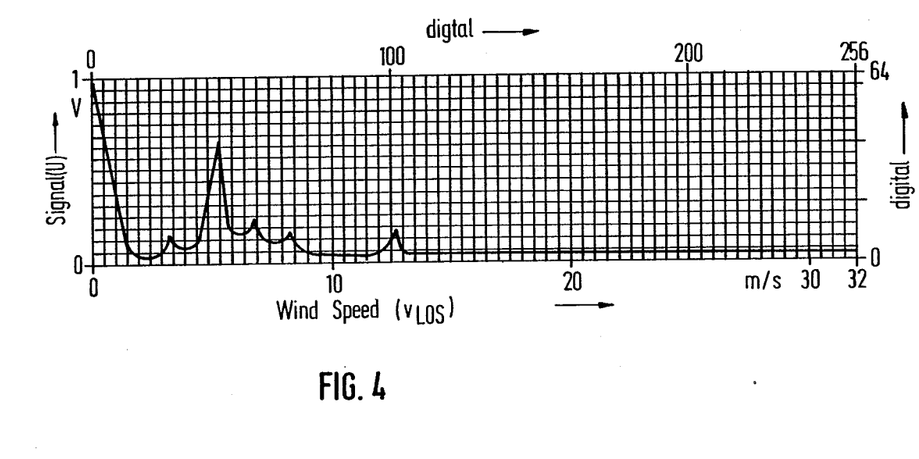
FIG. 4 shows a Doppler spectrum in a field reproduced digitally.

In FIG. 4 there is shown a typical spectrum of a spectrum analyzer. In this spectrum, the signal voltage (U in volts) is plotted on the ordinate and the wind speed ($v_{LOS}$ in m/s) is plotted on the abscissa. The corresponding digital values are shown parallel to the ordinate and abscissa on the right and top margins, respectively. In this connection, the integrator of the LD-anemometer shown in the block diagram of FIG. 3 serves as the data source. This integrator generates frequency spectra which are averaged via selectable intervals of time ranging from 1.6 to 52 ms, and which contain the wind information. In particular, the position of the peak in the spectrum conforms to the quantity of the radial component of the wind within and outside of the measurement volume. The components relating to fog and clouds have their origin outside of the measurement volume.

Only the peak values of each spectrum are used in order to reduce the amount of data to be transmitted. A special interface selects the position of the peak in amplitude and speed channels with the help of the aforedescribed digital differentiation method.

The amplitude of the wind peaks depends on the scattered particles in relation to the sharply focused distance. The interface unit in FIG. 3, which is referred to as interface "recording", selects the information from the distance, elevation and azimuth positions as well as from the angle information, which information is selected in data blocks, and records a complete block every 50 ms by way of a format generator in a tape recorder, which, by way of example, may be a tape recorder type Kennedy 8000 CCT. In this step, each head of a block contains the measuring range as well as the number of peaks (for example: 6 peaks in FIG. 4). The block itself contains the amplitude as well as the radial wind speed of each peak. In this way, 188 peaks may be detected. The sign (+ or −) of the radial speed cannot be determined when using the LD-anemometer of the invention because the latter is a homodyne system. In FIG. 4, the first peak is the strong spectral zero-frequency peak (which is not of interest in this connection).

In a measuring campaign, the data gathered or determined may be analyzed with the help of an additional interface unit "reading" as shown in FIG. 3, from the same computer as the one used for recording the data.

This measure is required in order to safely assure that all acquired data have been correctly determined and entered. Furthermore, the level of individual peaks, i.e., their amplitudes, may be optimized further by noise level suppression.

Three examples, in which rapid or high-speed sector scanning is particularly advantageous, are described in the following in order to show the possibilities for using the measuring device of the present invention:

(a) Determination of multiple wind peaks caused by cloud and/or fog echoes;

(b) Sector scanning at an installation site where the measuring range, i.e., the visual segment, is greatly limited or restricted; and (c) Scanning for detecting the wake vortices of an aircraft.

The data system used is capable of storing 20 blocks each second and has an azimuth angle resolution of 1°, which means a minimun scanning speed of 20° per second.

Figure 5:
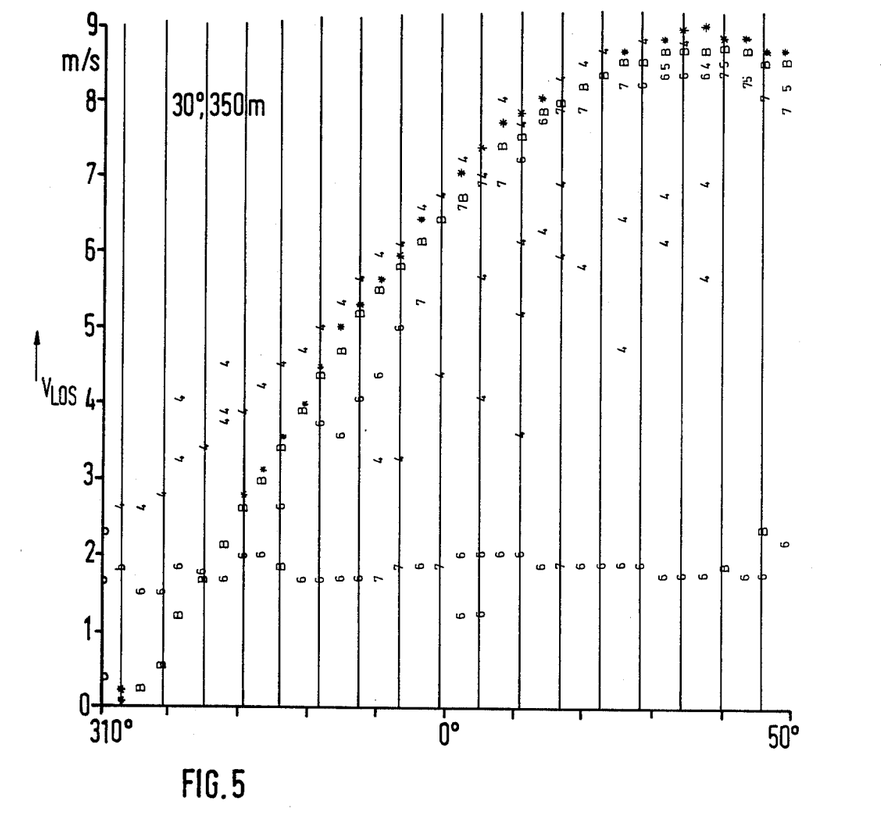
FIG. 5 is a computer printout of a speed spectrum at a 30° elevation angle at a distance of 350 meters at an azimuth angle between 310° to 50°.

(a) Determination of multiple wind peaks:

In the determination of multiple wind peaks, the influence of clouds and fog on wind measurements with a $CO_2$-continuous wave laser-Doppler anemometer is known and described in the relevant literature. In addition to the windpeak from the focused measurement volume, a number of other peaks are generated by clouds or fog outside of the focused range. Said peaks, during scanning in the azimuth direction, are different from the peaks originating from the measurement volume with respect to their phase and speed behavior. FIG. 5 shows an example of a printout result of a computer obtained by high-speed scanning across a range of about 90 degrees. In this FIG. 5, the stated numbers of the digitalized signal amplitude and its position conform to the sight-line speed (which can be derived from FIG. 4). In FIG. 5, furthermore, a sector slightly exceeding 90 degrees is shown, and the letter "B" represents a value of a sine wave conforming to the curve identified by numeral 6.

Furthermore, FIG. 5 shows constant peak positions, which are created by the system, as well as a number of additional noise peaks, with the amplitude value of 2 being close to the noise level. The rectified sine wave reflects the wind signal (values 4 to 7), from which it is possible to derive the azimuth-dependence of the sight-line speed, based on which the speed and direction of the wind field may be computed. The column at the beginning of the curve shows for each block the azimuth, elevation and range information; the measurement shown in FIG. 5 was carried out at an elevation angle of 30 degrees with a 700-meter focusing range at an azimuth angle of 70° to 172° relative to the system axis.

Preferably, the computation starts with the input of the selected azimuth angle range, within which the computation is valid. Ranges where obstructions, pylons etc. interfere with the measurement, are disregarded. Furthermore, the mean or average wind direction is entered in the computer in order to establish the actual wind direction. In this case the axis of the measuring device is placed at an angle relative to the northern direction in order to ccrrect the wind direction. Furthermore, some filtering operations must be carried out, whereby the noise level (for example $\leq 2$) reduces the number of valid, usable peaks. A matrix (A) is generated for each intensity (X index 3=0). In tte next step, great deviations from a sine wave are taken into account, whereby values with very large deviations are separated and set to zero. After said steps have been carried out, the condition $x_3=0$ is no longer valid. Now, the computation is started. FIG. 5 shows a sine wave of the intensity value 6, which is identified by the letter "B". Since this value B very closely matches or fits the course of the sine wave, we know that the curve identified by the intensity value 4 has a different phase, but nearly the same speed.

Figure 6:
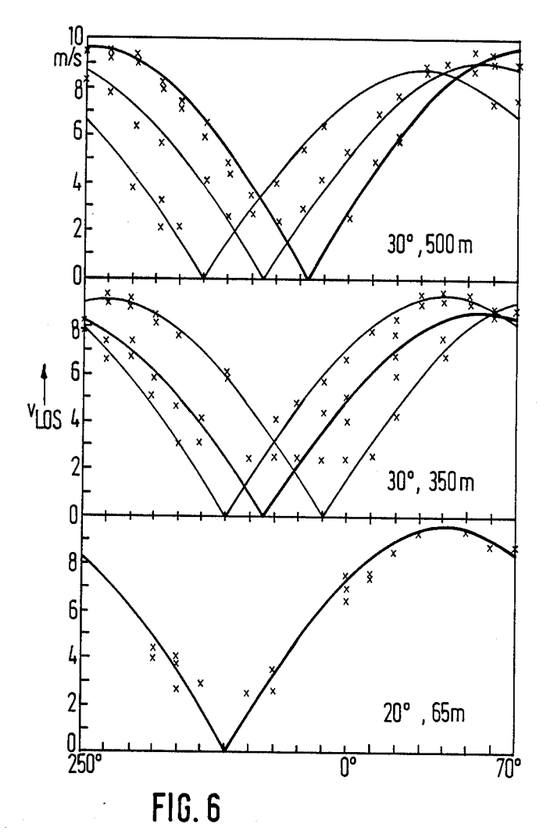
FIG. 6 shows a sector scan sine wave adjustment for three different altitudes under fog and cloud conditions.

FIG. 6 shows part of the computer work for three different altitudes. In the three curves, the sight-line speed $v_{LOS}$ plotted on the ordinate is shown above the azimuth angle plotted on the abscissa in 10° intervals. Each cross plotted in the diagrams represents a valid peak without detailed amplitude information. Said recordings were generated by a computer, showing the poorest case of wind measurements carried out with the LD-anemometer because a layer of dust was present on the ground and a layer of clouds at an altitude of 850 meters.

FIG. 6 shows also the method or process for treating multiple-peak information. When measurements are started, beginning with the first layer close to the ground and proceeding towards greater altitudes and the information "dust or no dust" or "cloud or no cloud" is entered in the computer, the computer is capable of treating said information as if it were an additional filter. In the computer printout shown in FIG. 5, the "stars" originate from the dust layer information (with respect to speed and direction), and said values, which are characterized by the "stars", confort very closely to the curve conforming to the intensity 6, or to the adjustment B.

Figure 7:
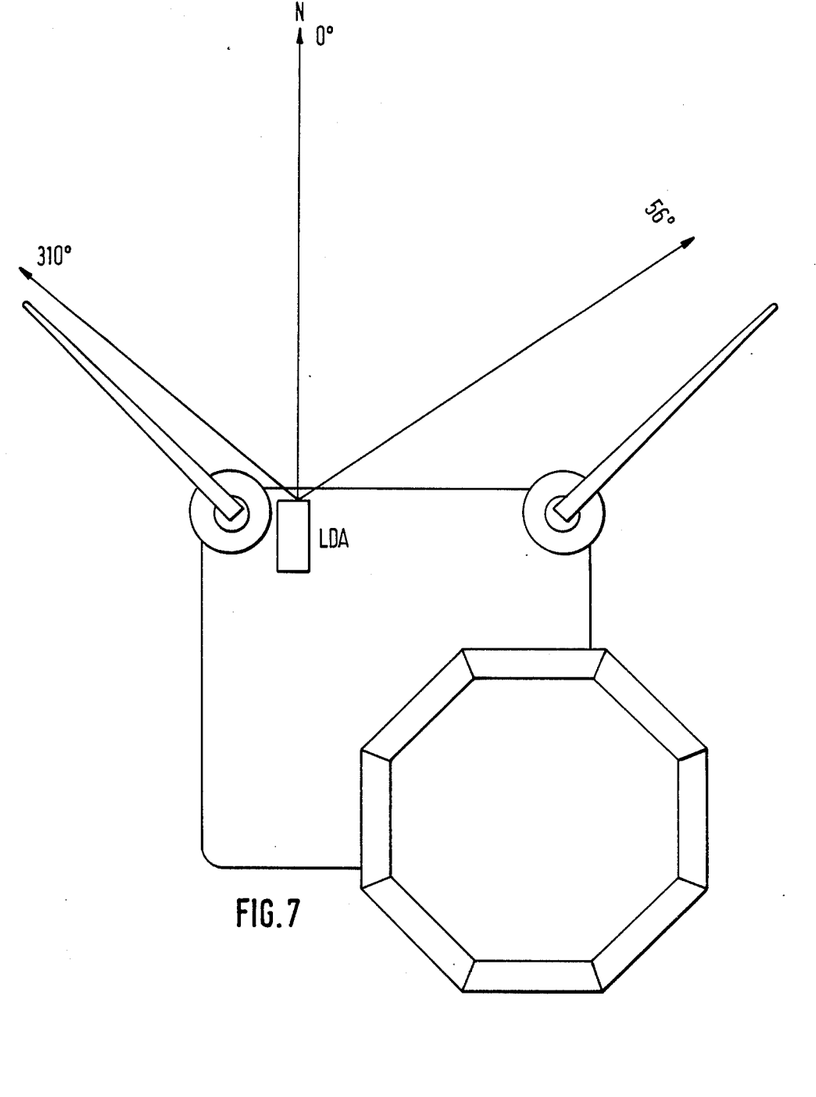
FIG. 7 shows the installation site of an LD-anemometer installed in a container mounted on a platform in the North Sea, with the sight sector plotted in the figure.

(b) Measurements within limited sight segments:

Often, the sky can be "seen" from the installation site of a measuring arrangement within a limited sector only. With the measuring device of the invention, it is possible to obtain a wind sector for the boundary layer. For example, the objective is to obtain the wind profile above sea level from a floating platform. In a practical case which is sketched in FIG. 7, the measurement had to be carried out from a position which was partly obstructed by pylons and cranes and a helicopter landing platform. The sight sector viewing the ocean in the northern direction came to approximately 120 degrees. In FIG. 7, the possible or available field of view is shown by the azimuth angle data 310° to 56°.

Figure 8:
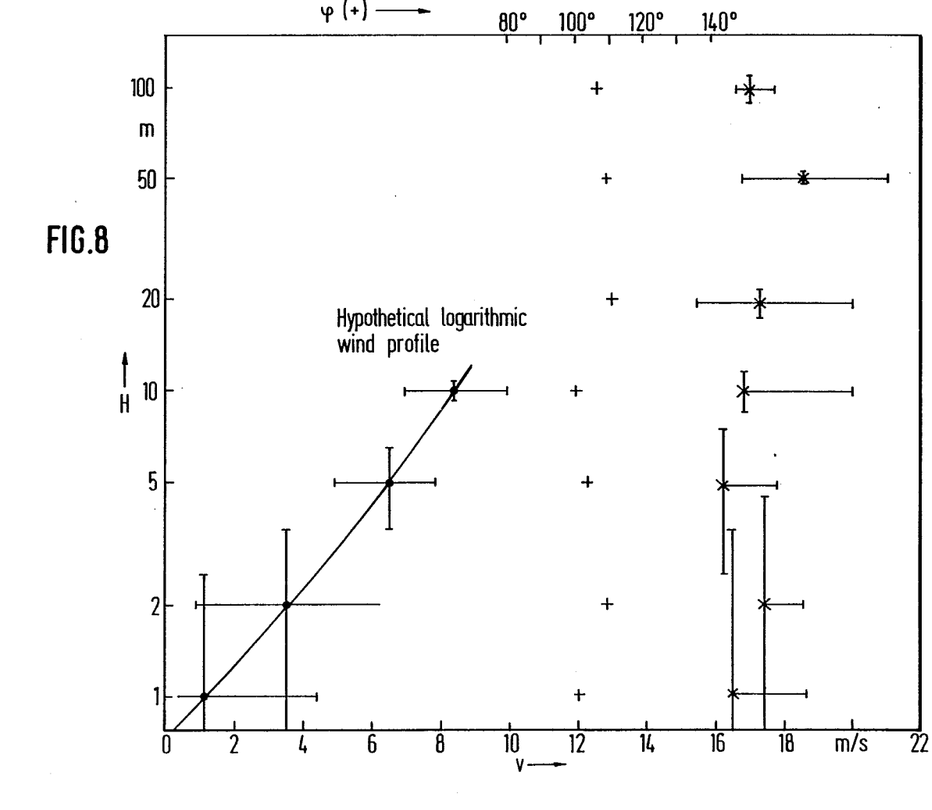
FIG. 8 shows vertical wind profiles for an LD-anemometer sector scan measurement, with a hypothetical, logarithmic wind profile plotted in the figure for comparison purposes.

In FIG. 8, the measured wind profile is measured in two ranges, namely 175 meters and 250 meters, from platform, in levels of 0 to 100 meters above sea level. The wind profile measured at a distance of 175 meters is shown with error lines with respect to altitude resolution and wind deviation. No measured logarithmic wind profile is obtained, but only the turbulence increases in the direction of the surface of the sea. In the bottom left part of FIG. 8, furthermore, a hypothetical wind profile is plotted, which was known from preceding or earlier measurements. The direction of measurement was leeward of the platform. If the wind blows from the northern direction, this has no influence on greater distances.

(c) Detection of patterns of the wake vortices of landing aircraft:

As mentioned earlier, large aircraft, during landing, create very violent wake vortices that may be hazardous to other, particularly smaller airplanes following the large aircraft. Since the problem of such eddy currents or turbulence in the wake of aircraft during landing may influence the handling capacity of large airports and particularly the operation on parallel extending runways, it is very important to have knowledge of the path of the wake vortices of landing aircraft.

Figure 9:
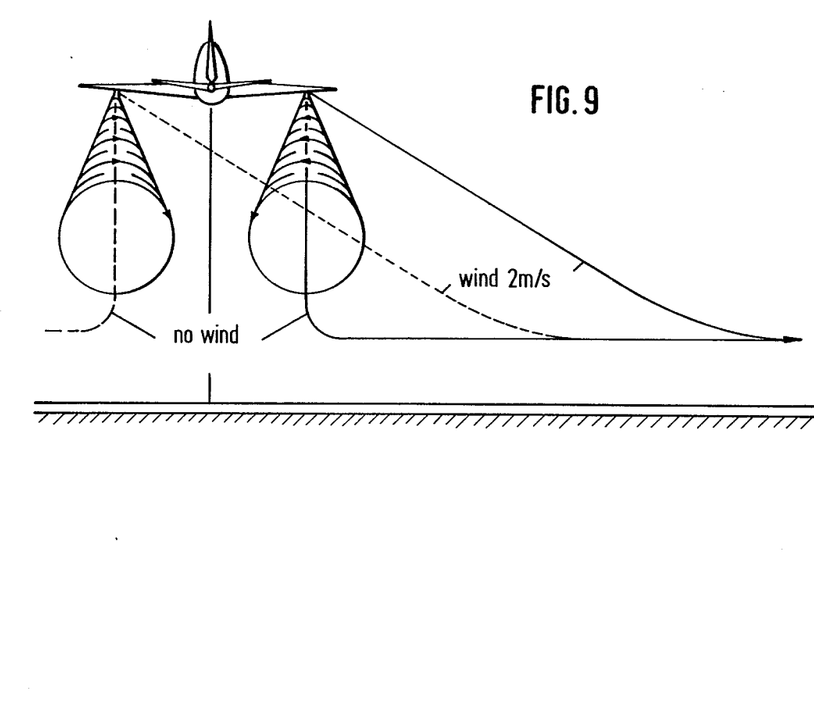
FIG. 9 shows the principal creation of the wake vortices of a landing aircraft.
Figure 10A:
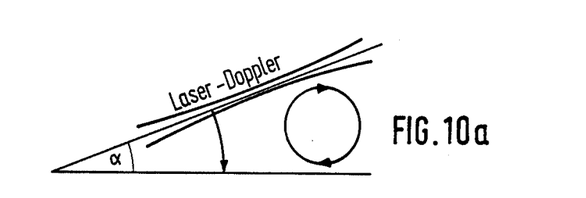
FIG. 10a shows the principle of measuring with an LD-anemometer the wake vortices trailing an aircraft.
Figure 10B:
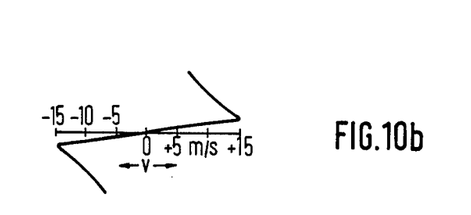
FIG. 10b shows a curve in which the tangential speed of the wake vortices trailing an aircraft is plotted.
Figure 10C:
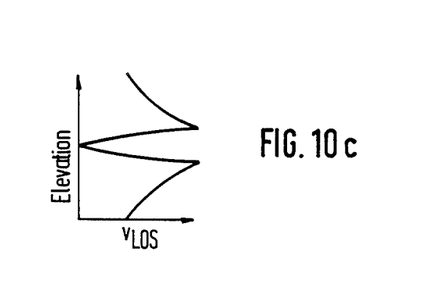
FIG. 10c shows rectified profiles of wake vortices in a Homodyn-LD-anemometer.

The creation and formation of such wake vortices is shown schematically in FIG. 9, and with the help of curves illustrated in FIGS. 10a to 10c. While landing, a large aircraft generates in its wake a pair of wake vortices. With a cross wind of 0 or 2 m/s, the theoretical curves of expansion are shown for the right-hand vortex by solid lines, and for the left-hand vortex by dashed lines.

A vertical imaginary scanning plane is fixed perpendicular to the direction of the runway. On this plane, a sufficient height between the surface and vortex to be expected is covered by rapid elevation scanning. A corresponding range of angle of, for example, from 0° to 30° and a scanning speed of, for example 10° to 20°/s may be selected by input via a keyboard. Thereafter, the scanning of the elevation angle runs automatically.

An LD-anemometer was installed for test purposes at the Frankfurt airport between runways 25L and 25R in order to test under practical conditions the theoretically known behavior of the wake vortices of landing aircraft. The spacing to the runways was about 260 meters. In addition, the same LD-anemometer was installed for two weeks at the so-called "base-to-final approach turning point" ("Gehspitz") which is located 5 km outside of the airport area below the end of the final approach leg of runway 25L.

The complete scan is illustrated in FIGS. 10a and 10b. A programmed scan starts with a high-speed elevation scan, for example between 2° to 20° and 18°/s with the range set at 260 meters. When an aircraft is passing by, an vortex signal appears on the monitor. Vortices coming closer to the LD-anemometer are traced by manually controlled distance reduction. If the position of such wake vortex of a landing aircraft is closer than 100 meters, the azimuth direction is changed by 180° and the elevation scan is continued on the opposite side of the LD-anemometer. Now, if the vortex again reaches the scanning volume, it is now traced by increasing the distance until the vortex has been dissipated. Such a measuring program may have a duration of several minutes.

The frequency spectra at the output end of the LD-anemometer contain the information with respect to the speed distribution within the volume of measurement. Normally, there is a peak conforming to the radial component of the wind vector (see FIG. 4). As soon as a vortex enters the scanning volume, the wind peak becomes smaller or disappears, and a complex signal structure appears. The maximal tangential speed in the vortex may be derived from the position of the high-frequency flank. FIG. 10c shows the simplified recording or time sequence.

Figure 11:
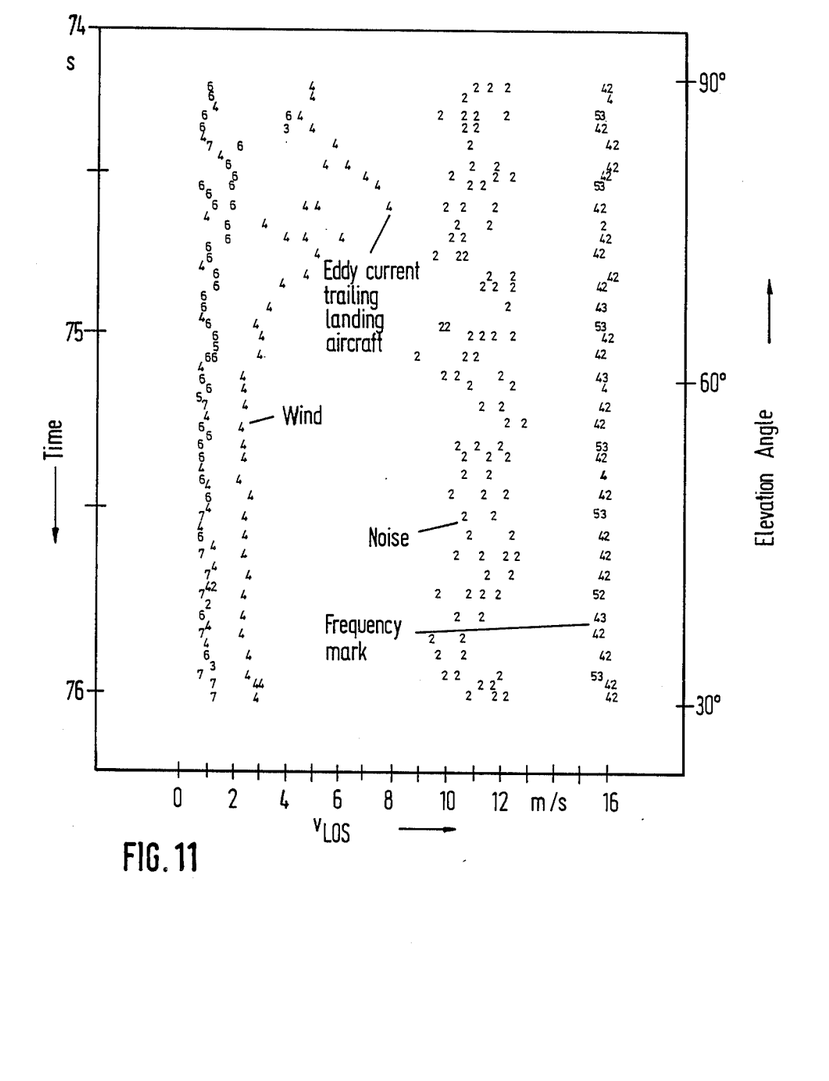
FIG. 11 is a computer printout of an information of about 50 blocks from a special memory.

FIG. 11 shows a computer printout of two scan seconds. In the direction of the ordinate in FIG. 11, time is plotted on the left and elevation angle on the right, and the sight-line speed $v_{LOS}$ is plotted on the abscissa. The time was set to start to be recorded when an aircraft passed by, and the elevation angle scan was set between 30 and 90 degrees. The duration of the scan was 2 seconds. A vortex was measured near 90° (from the installation site at the point of "base-to-final approach"); the speed of the vortex was near 8 m/s. The homodyne laser-Doppler-method does not supply any sign (+ or −) for the direction; only the speed value is measured. The sign (+ or −) of the speed of the vortex may be obtained based on the knowledge of the wind speed and its direction.

In FIG. 11, two different maximum wind speeds $v_{LOS}$ are plotted, namely one near the elevation angle of 70° and one near the elevation angle of 80°, with a minimum in between. The minimum represents the point where the sign changes (i.e., passes through zero). The two maximum speeds are clearly different from the wind normally prevailing at that point. In the direction of the wind, the normal wind is added to the vortex component, and deducted from the other component against the direction of the wind.

Figure 12:
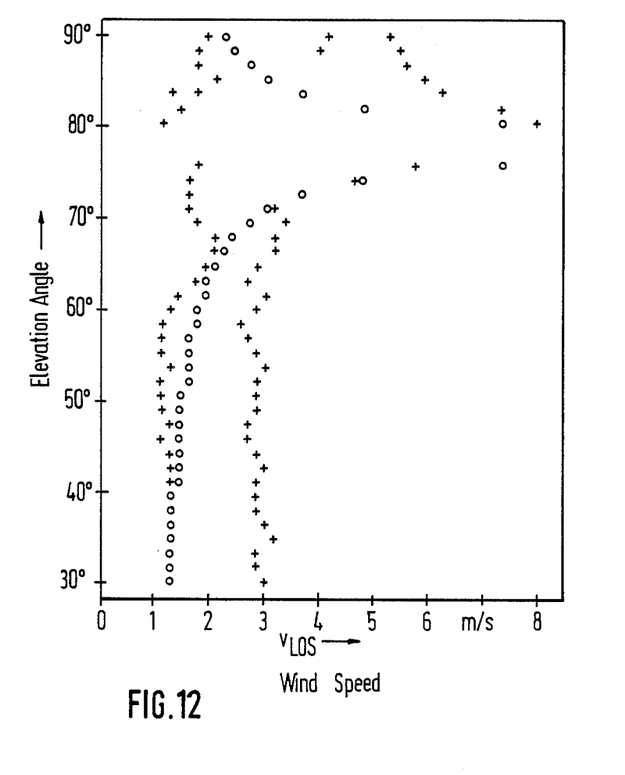
FIG. 12 shows a computer printout of an experimental plotting (+) of an aircraft wake vortex, and the best adjustment to a theoretical model (o) for the same example as in FIG. 11.

FIG. 12 shows another computer printout for the same example, i.e., the one shown in FIG. 11. Here, the peak values of the wind and the aircraft wake vortex are printed out as plus (+) signs. The best adjustment to a theoretical model is printed out in the form of circles (o). In said figure, the mean speed has already been deducted, so that the two peaks of vortex have the same speed. With the help of such a pattern detection scan it is possible to determine the development of an aircraft wake vortex. The location of the center of the vortex can be exactly determined and fixed for each scan. With the help of additional data such as the value of the angle and distance or range, the computer can plot the altitude of the center of the aircraft wake vortex against the distance from the center line, and the maximum tangential speed above the distance. In this way, it is possible to estimate the influence which aircraft landing on the one runway have with respect to traffic on one or several other parallel runways.

While only a single embodiment of the present invention has been shown and described, it will be obvious that many changes and modifications may be made thereunto without departing from the spirit and scope of the invention.

What is claimed is:

1. A method for determining the direction and speed of wind in the atmosphere by means of a laser-Doppler anemometer with a scanning mechanism, comprising:

scanning by means of a Heterodyne Doppler-LD anemometer a sector of about 100° and less in each horizontal circle of a series of circles of different heights which are centered with respect to the vertical axis of the scanner, said scanner receiving signals based on radial wind speed data which can be used to determine the mean velocity and direction of the horizontal wind;

digitalizing the signals received by the scanner by means of an analog-to-digital converter;

determining the maximum peak amplitude of each signal in a multiple peakfinder by comparing a preceding measured value with a following measured value until the following measured value is less than the preceding measured valude; and evaluating from said maximum signal peak the Doppler frequency shift and determining the azimuth of said maximum signal peak, said Doppler frequency shift being proportional to the speed of the wind and said azimuth determining wind direction.

* * * * *